Feb. 20, 1968   C. P. PORTERFIELD ET AL   3,370,250

ALTERNATING CURRENT FREQUENCY CONVERTER

Filed Oct. 27, 1964

*INVENTOR.*
CECIL PAUL PORTERFIELD &
GEORGE ANDREW KAPPENHAGEN
BY
*Brumbaugh, Free, Graves & Donohue*
their ATTORNEYS

United States Patent Office 3,370,250
Patented Feb. 20, 1968

3,370,250
ALTERNATING CURRENT FREQUENCY CONVERTER
Cecil Paul Porterfield, Brecksville, and George Andrew Kappenhagen, Parma, Ohio, assignors to The Ohio Crankshaft Company, Cleveland, Ohio, a corporation of Ohio
Filed Oct. 27, 1964, Ser. No. 406,862
1 Claim. (Cl. 331—49)

ABSTRACT OF THE DISCLOSURE

In the particular embodiment of the invention described herein, two transistor multivibrators energized from the same alternating current source through a capacitor divider circuit oscillate at a frequency greater than that of the source during opposite halves of the alternating current cycle, respectively. Each side of each multivibrator is connected in parallel to the corresponding side of the other multivibrator and to a load element so that two load elements are energized at high frequency during the complete alternating current cycle.

---

This invention relates to frequency converters and, more particularly, to a new and improved frequency converter for converting alternating current line frequencies directly to much higher frequencies at the site of a load.

Heretofore, the conversion of alternating current power from line frequency to high frequency power, for use with loads requiring high frequencies, has been accomplished by rectifying the alternating current power and then generating from the resulting direct current power a high frequency alternating current voltage. Consequently, conventional high frequency power supplies for heating and welding units and the like have been characterized by considerable size and complexity and relatively high cost.

Accordingly, it is an object of the present invention to provide a new and improved alternating current frequency converter which effectively overcomes the above-mentioned disadvantages of present frequency converters.

Another object of the invention is to provide a new and improved high frequency power supply characterized by its small size, low cost and simplicity of arrangement.

A further object of the invention is to provide a frequency converter especially adapted for use as a high frequency power supply at the location of a load, such as an induction or resistance heating or welding unit.

These and other objects of the invention are attained by providing an electronic switch which is adapted to be connected to a conventional alternating current source, a circuit arranged to control the operation of the switch at a selected frequency which is greater than the alternating current frequency, and an output circuit to supply power at the selected frequency. Preferably, the switch comprises a multivibrator arranged to apply current at the selected frequency to the output circuit during one portion of the input current cycle and, in a particular embodiment, two multivibrators are connected to apply current to an output circuit during the opposite polarity portions of the input current cycle, respectively. A preferred arrangement for each of the multivibrators includes a pair of solid state switch devices, such as transistors and, in a particular embodiment, the transistors are connected in series with each other across the input power source and provide high frequency power to two separate output circuits.

Figure 1:
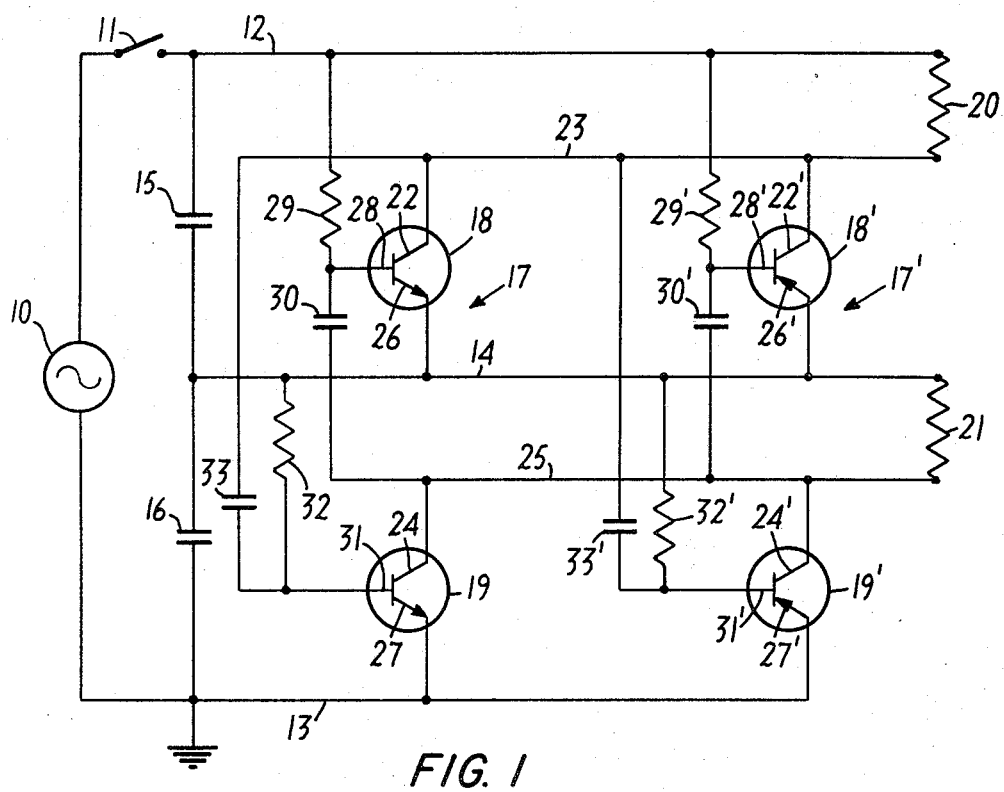
Figure 2:
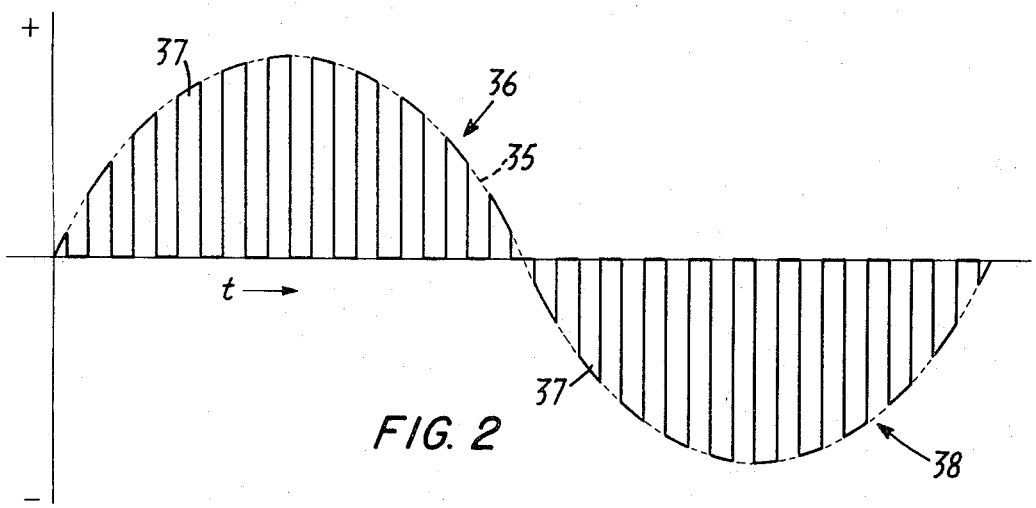

Further objects and advantages of the invention will be apparent from a reading of the following description in conjunction with the accompanying drawings, in which:

FIG. 1 is a schematic circuit diagram illustrating a representative alternating current frequency converter arranged in accordance with the invention; and FIG. 2 is a graphical representation of the voltage wave form produced at the output circuit of the frequency converter illustrated in FIG. 1.

In the typical circuit arrangement shown in FIG. 1, a conventional alternating current power supply 10 providing power at, for example, 60 cycles per second, is connected through a switch 11 through two conductors 12 and 13, the conductor 13 being grounded. Another conductor 14 is connected to a voltage divider storage circuit consisting of a capacitor 15 joined to the conductor 12 and a second capacitor 16 connected to the conductor 13, both of the capacitors preferably having the same capacitance value.

To provide power at a high frequency, a multivibrator 17 includes two transistors 18 and 19 of the NPN-type connected to operate in series with two output circuit load impedances 20 and 21 across the input conductors 12 and 13. In this regard, the collector electrode 22 of the transistor 18 is connected to a conductor 23 leading to the load impedance 20 and the other end of that impedance is joined to the conductor 12. Likewise, the collector electrode 24 of the transistor 19 is connected to a conductor 25 which leads to one side of the load impedance 21, the conductor 14 being joined to the other side of that impedance. Although the load impedances 20 and 21 are illustrated as being resistive in character representing, for example, high frequency resistance welding units, they may, of course, comprise impedances of a reactive character such as in high frequency induction heating units.

In the circuit of the multivibrator 17, the emitter electrode 26 of the transistor 18 is joined to the conductor 14 and the emitter 27 of the transistor 19 is connected to the conductor 13. To complete the circuit, the base electrode 28 of the transistor 18 is connected to the conductor 12 through a resistor 29 and to the collector electrode 24 through a feed-back capacitor 30, while the base electrode 31 of the transistor 19 is connected to the conductor 14 through a resistor 32 and to the collector electrode 22 by a feed-back capacitor 33.

In order to apply high frequency power to the output circuit load impedances 20 and 21 during the negative half of the input voltage cycle when the multivibrator 17 is not operating, a second multivibrator 17' is provided. Inasmuch as the multivibrator 17' is identical to the multivibrator 17 except that the transistors 18' and 19' are of the PNP type so as to conduct current in the opposite direction, the arrangement need not be described in detail herein, the corresponding elements being represented in the drawing by primed reference numerals. In both of the multivibrators 17 and 17', the desired high frequency of the output power appearing across the load impedances 20 and 21 is determined by appropriate selection of the resistors 29, 29', 32 and 32' and the capacitors 30, 30', 33 and 33' and, preferably, identical values of resistance and of capacitance are provided so as to assure the same high frequency during both halves of the input current cycle. In addition, the capacitors 15 and 16, which also influence the value of the output frequency, also preferably have the same value.

Considering first the operation of the multivibrator 17, it will be assumed that the alternating 60-cycle voltage of the conductor 12 with the switch 11 closed, which is represented by the dotted line 35 in the graphical illustration of FIG. 2, is in the positive half cycle 36 as shown at the left side of that figure. In addition, for purposes of illustration, it will be assumed that the transistor 18 starts conducting current before the transistor 19.

As increasing current is drawn through the load impedance 20, the base electrode 31 of the transistor 19 becomes less positive, shutting off any current drawn by that transistor through the load impedance 21 and thus making the base electrode 28 of the transistor 18 more positive with respect to the line 14 to which the emitter 26 is connected. As a result, more current is drawn by the transistor 18 and the transistor 19 is positively maintained in the non-conductive condition. During this period, the current through the transistor 18 is supplied by the charge stored in the capacitor 16, thereby tending to reduce the positive voltage at the base electrode 31 but, at the same time, the capacitor 33 discharges through the resistor 32 tending to drive the base electrode 31 more positive so as to draw current through the load impedance 21.

When current is drawn through the impedance 21, the reduced positive voltage at the base electrode 28 shuts off the transistor 18, thereby terminating the current through the load impedance 20. In FIG. 2, the instantaneous potential across the impedance 20 is represented schematically by the solid line 37 and, as there illustrated, the voltage across the load 20 throughout the positive half of the input voltage cycle alternates at high frequency between the potential of the conductor 12 represented by the dotted line 35 and zero. During the same half cycle, the instantaneous voltage (not represented in FIG. 2) across the other load impedance 21 complements that of the load 20 being at the magnitude of the line 35 when the solid line 37 is zero and being zero when the line 37 is at a positive level. Although, for convenience of illustration, an output frequency only about twenty-five times that of the input frequency is illustrated in FIG. 2, it will be understood that, by appropriate selection of component values, frequencies up to the megacycle range or higher may be produced by the frequency converter of the invention.

During the positive half of the input voltage cycle, the multivibrator 17' is inactive, the PNP transistors 18' and 19' being non-conductive for applied positive polarity. When the alternating input voltage reverses, however, the multivibrator 17 becomes inactive since the NPN transistors are non-conductive. At the same time, the PNP transistors 18' and 19' become conductive causing the multivibrator 17' to operate at high frequency in a manner similar to that just described with respect to the multivibrator 17 but with the polarity designations reversed. Accordingly, the voltage wave form shown in the right half 38 of FIG. 2 is produced at the load impedance 20 and a complementary voltage is produced at the load impedance 21.

It will be readily apparent that even during the portion of the input voltage cycle in which a multivibrator is operative, each transistor therein is conductive only half of the time and, since each transistor is completely at rest during the portion of the input voltage cycle in which the multivibrator is inactive, the overall duty cycle for each transistor is only 25%. Also, the very short switching times possible with most present-day transistors contributes to the very low power dissipation of the system. Furthermore, since the transistors are mounted on a heat sink of considerable mass in a practical embodiment, they will rapidly lose any heat which may have been generated by the current drawn through them during the conductive half of the input voltage cycle. Consequently, considerably greater instantaneous current loads may be drawn through the transistors than would be possible if they were operated continuously or for a greater percentage of the time.

In a representative operating embodiment of the invention, the load impedances 20 and 21 each had a value of 91 ohms, the resistors 29, 29', 32 and 32' each had a value of 1,000 ohms, the input capacitors 15 and 16 each had a capacitance of 0.22 microfarad and the feedback capacitors 30, 30', 33 and 33' each had a value of 0.022 microfarad. In addition, the NPN transistors 18 and 19 were of the type designated 2N1304, while the PNP transistors 18' and 19' were of the type designated 2N1305. With this arrangement, an output voltage having a frequency in the neighborhood of 50,000 cycles was obtained. It will be understood, of course, that other transistors of a similar type may be used in the illustrated circuit as, for example, those designated 2N1306, 2N1307, 2N2218, TA2458 and TA2470. If transistors are used which have a reverse voltage breakdown value less than the reverse voltage applied to them in the particular application of the circuit, an appropriately oriented diode rectifier element may be included in the emitter circuit of each transistor to prevent application of excess reverse voltage thereto.

Although the invention has been described herein with reference to a specific embodiment, may modifications and variations therein will readily occur to those skilled in the art. For example, rather than using NPN-type transistors in one multivibrator and PNP-type transistors in the other, all of the transistors may be of the same type, the orientation and biasing arrangement of the transistors in one multivibrator being reversed with respect to that of the other one. Moreover, for certain applications, it may be desirable to provide biasing arrangements other than those described herein and appropriate resistive or reactive components may be added to the emitter or collector circuits of the transistors to produce the desired characteristics in the output voltage wave form. Also, in another modification, a three-wire alternating current supply might be used wherein the neutral or ground wire is connected through an impedance to the conductor 14, the capacitors 15 and 16 and the ground connection of the conductor 13 being eliminated. Accordingly, all such variations and modifications are included within the intended scope of the invention as defined by the following claim.

We claim:
1. An alternating current frequency converter system comprising capacitor divider means adapted to be connected across a source of alternating current, first multivibrator means including a pair of transistor means connected between an intermediate point on the capacitor divider means and the opposite sides, respectively, of the same alternating current source and effective to produce an output voltage having a selected frequency which differs from the alternating current frequency only during one half of the alternating current cycle, second multivibrator means including a pair of transistor means connected between the intermeditae point on the capacitor divider means and the opposite sides, respectively, of the alternating current source and effective to produce an output voltage having a selected frequency which differs from the alternating current frequency only during the other half of the alternating current cycle, and a pair of output means each connected to one of the transistors in both multivibrator means to provide an output voltage having a frequency different from the alternating current frequency during both halves of the alternating current cycle.

References Cited
UNITED STATES PATENTS 2,447,304   8/1948   Atkins _____ 331—71

OTHER REFERENCES

Sing: Electronics, "Multivibrators," pp. 28, 29, Jan. 31, 1964.

ROY LAKE, *Primary Examiner.*

JOHN KOMINSKI, *Examiner.*